United States Patent
Reimers et al.

[15] 3,642,111
[45] Feb. 15, 1972

[54] FULL ROW CONTAINER FEED SYSTEM

[72] Inventors: James Reimers, San Jose; Audrey J. Johnson, Santa Clara, both of Calif.

[73] Assignee: FMC Corporation, San Jose, Calif.

[22] Filed: Mar. 18, 1970

[21] Appl. No.: 20,691

[52] U.S. Cl. ................................198/21, 198/22, 198/24
[51] Int. Cl. .........................................................B65g 47/42
[58] Field of Search ...............198/21, 22, 24, 31 AB, 33 AD, 198/131, 34

[56] References Cited

UNITED STATES PATENTS

| | | | |
|---|---|---|---|
| 3,008,563 | 11/1961 | Carter | 198/24 X |
| 3,199,651 | 8/1965 | Lobik | 198/24 |
| 2,243,879 | 6/1941 | Meyer | 198/131 |
| 2,837,127 | 6/1958 | Luther | 198/34 A |

Primary Examiner—Joseph Wegbreit
Assistant Examiner—Alfred N. Goodman
Attorney—F. W. Anderson, C. E. Tripp and A. J. Moore

[57] ABSTRACT

A system for forming and feeding only full rows of containers into elongated carrier bars of a hydrostatic cooker or the like. The system includes a feed conveyor which advances containers into a feed station at a high speed. A pair of container decelerating slide rods lift the containers off the feed conveyor to reduce the speed of the containers, and a pneumatic stop cylinder is disposed at the downstream end of the feed station for gently stopping the containers in the feed station. Switches and a sensing unit detect the presence of a full row of containers in the feed station and allow deflection of only full rows from the feed station into the processing conveyor of the cooker. A screw feeder upstream of the feed station is stopped when a second sensing head disposed upstream of the feed station detects the termination of movement of the containers therepast.

16 Claims, 14 Drawing Figures

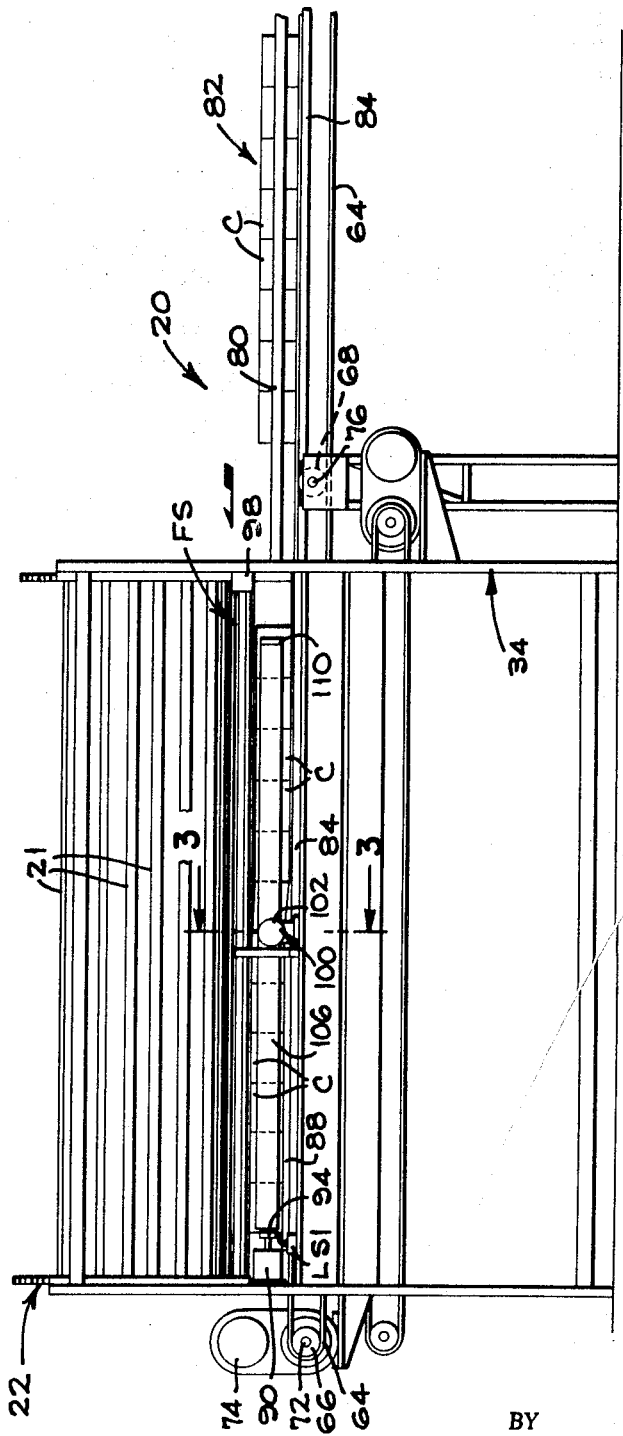

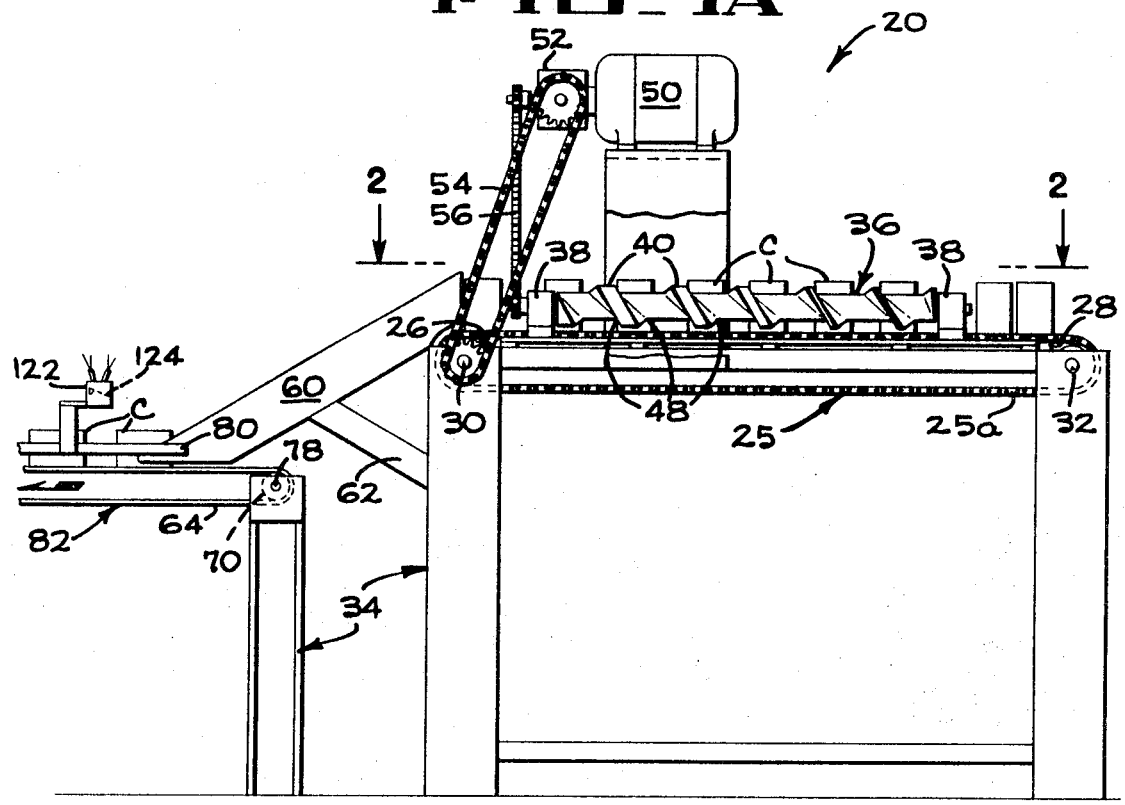
FIG_1A
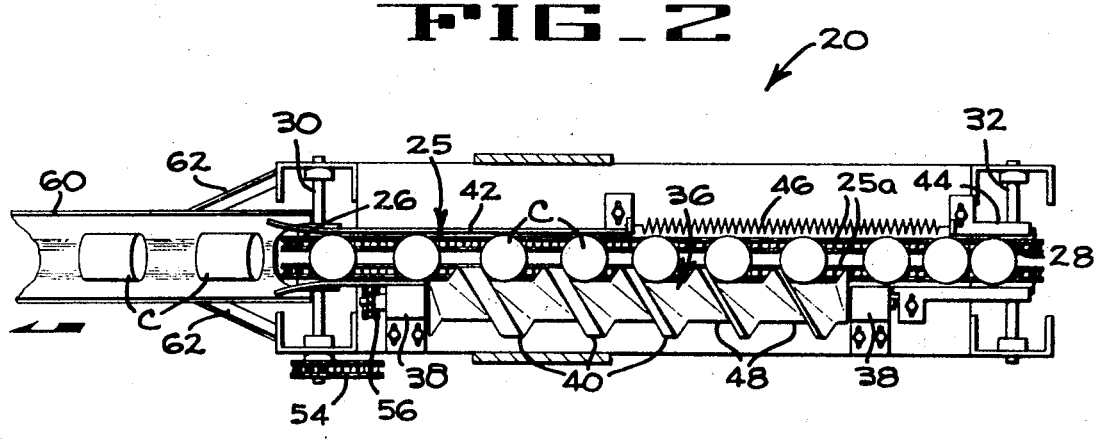
FIG_2

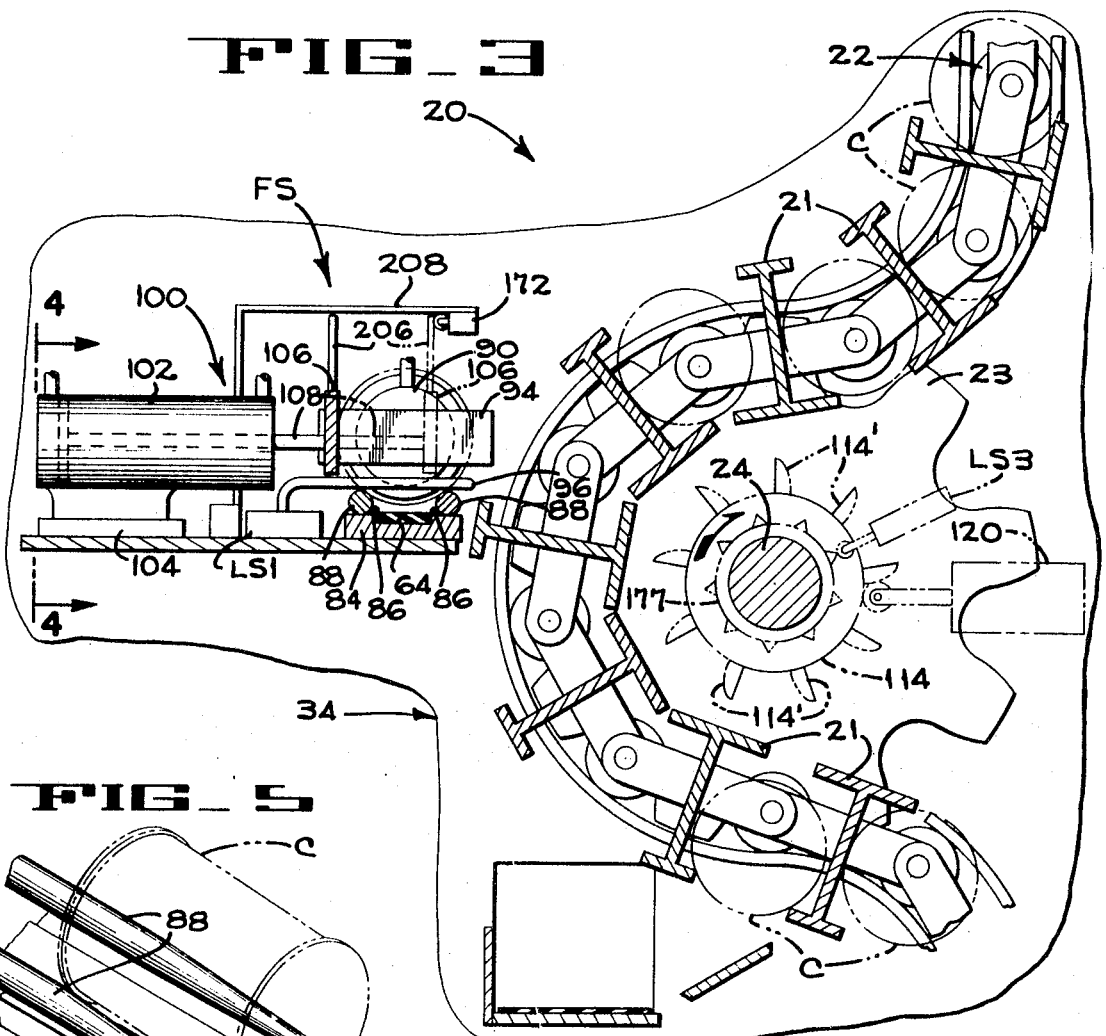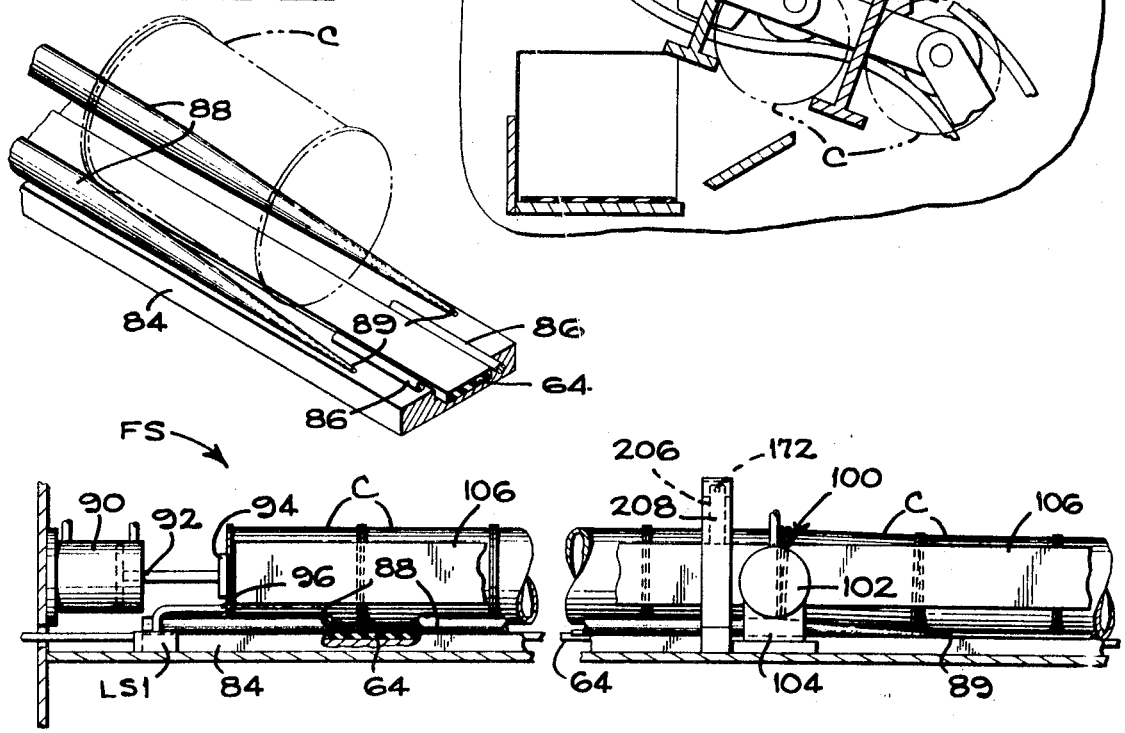

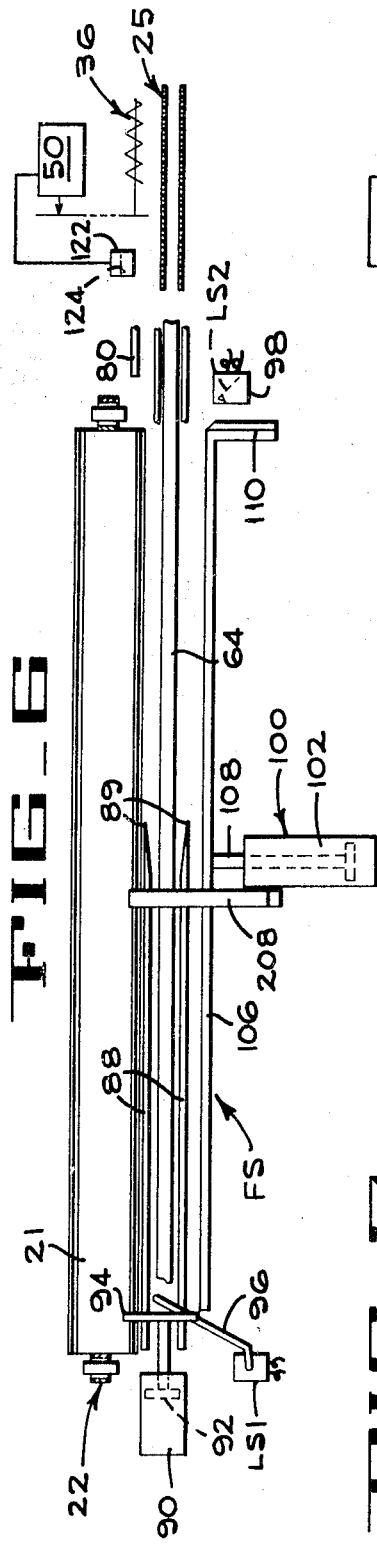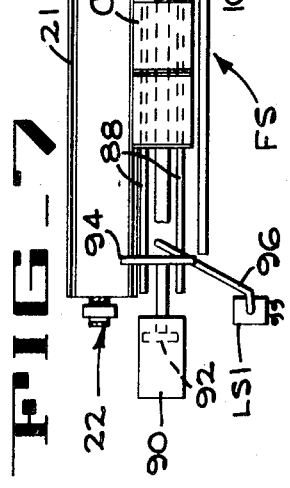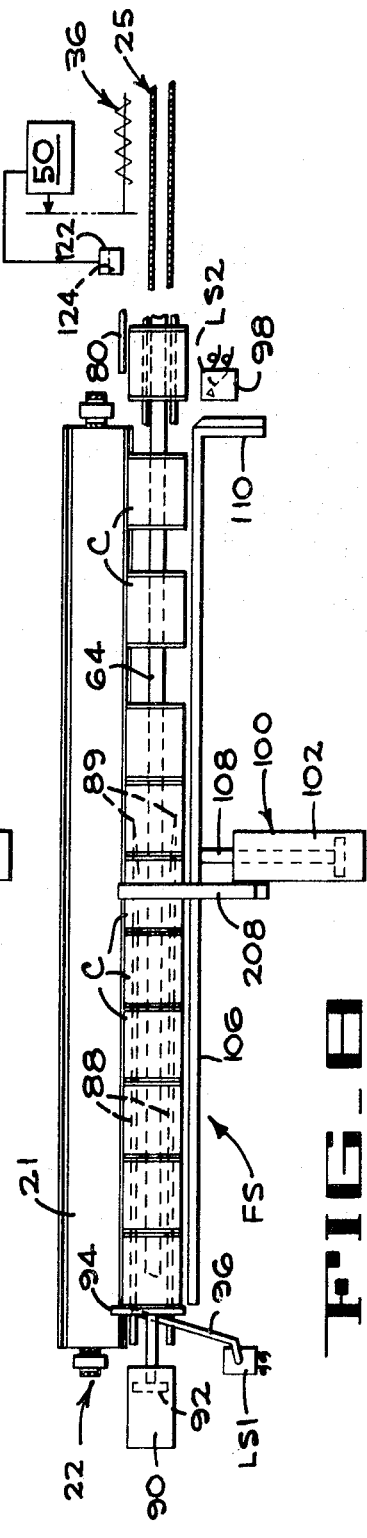

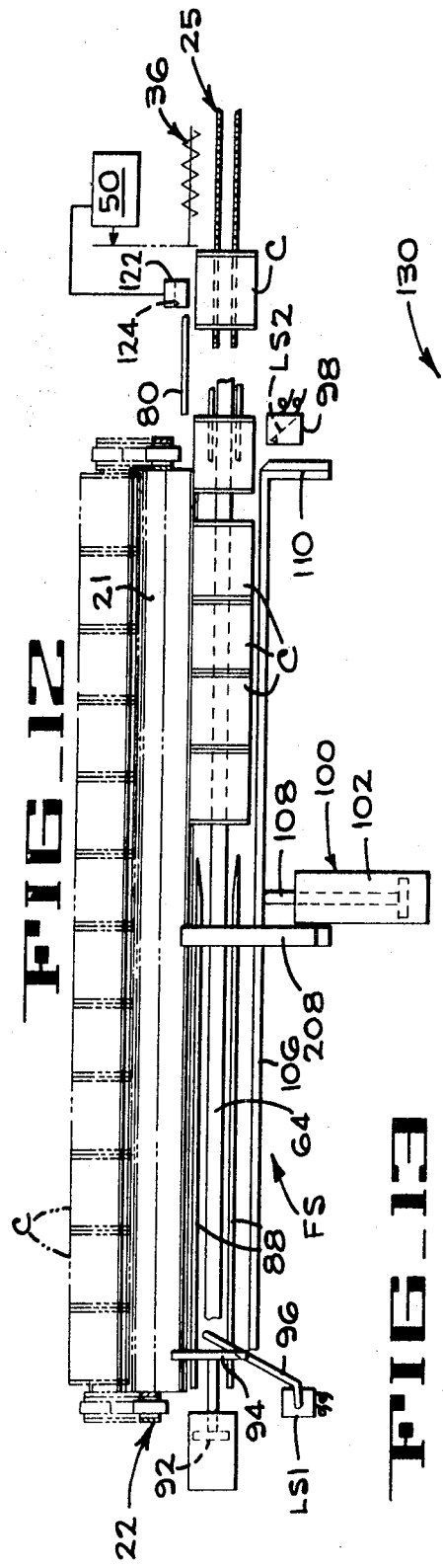
FIG_12
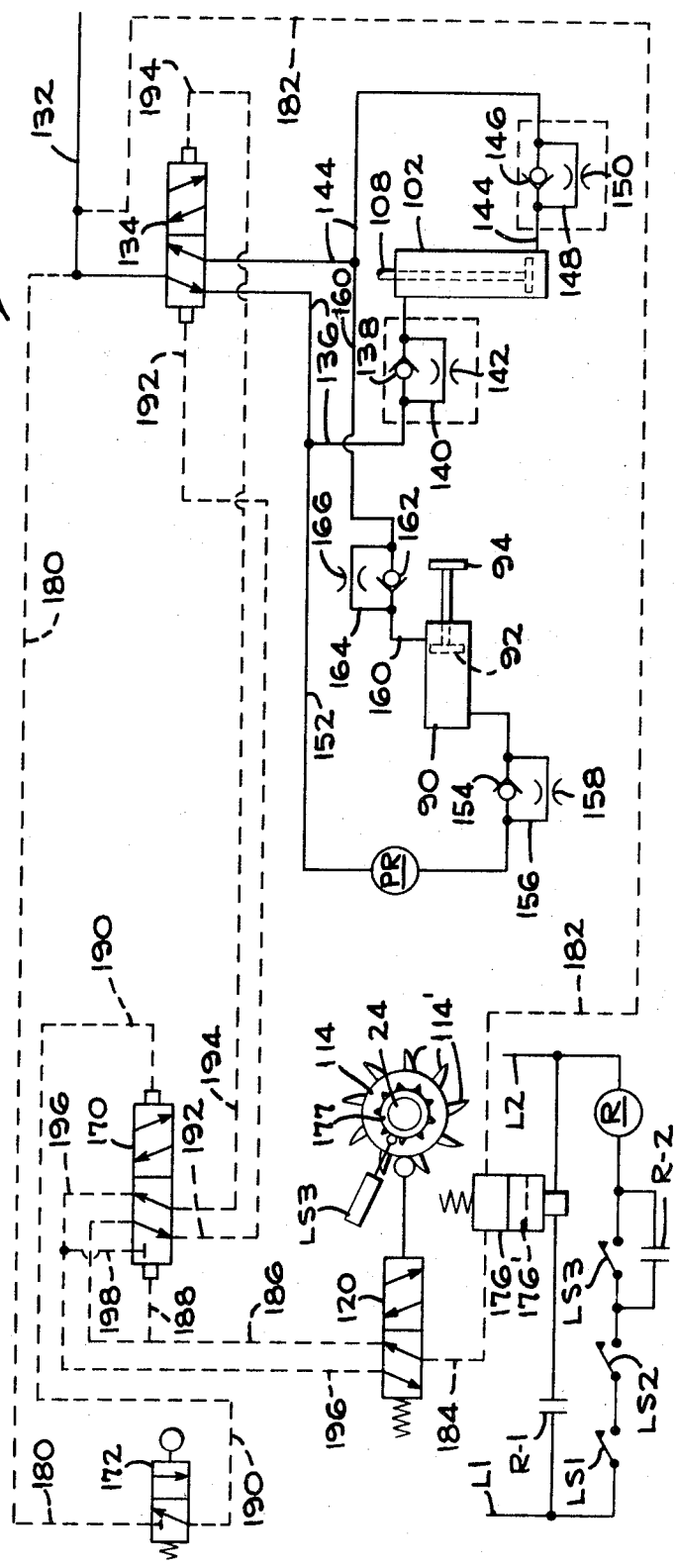
FIG_13

FULL ROW CONTAINER FEED SYSTEM

BACKGROUND OF THE INVENTION

1. Field of the Invention

This invention pertains to the cooking art and more particularly relates to a high-speed feed system which reduces container impact and which will feed only full sticks or rows of containers into the processing conveyor of the cooker.

2. Description of the Prior Art

Feed systems for hydrostatic cookers such as the systems disclosed in assignee's U.S. Pat. No. 3,144,122 which issued to John F. French on Aug. 11, 1964, or such as that disclosed in Reimers et al., application Ser. No. 795,283 which was filed on Jan. 30, 1969 requires a can clamping mechanism upstream of the feed station to assure reliable operation of the feed system. The prior art clamping mechanism not only add to the cost of the cooker but also limit the speed of the cookers to about 20 rows per minute.

SUMMARY OF THE INVENTION

The full row feed system of the present invention provides for the gentle formation of full sticks of containers when moving along a linear path at high speeds and without the aid of a clamping device upstream of the feed station so that the formed rows may be pushed transversely out of the feed station into carriers of a hydrostatic cooker at the rate of about 25 rows per minute. The system includes a pair of elongated container decelerating rods disposed in position to lift certain ones of the containers in each row off approximately the downstream half of the feed station thereby allowing the containers to gently decelerate from their high-linear movement by sliding along the rods during formation of each full row. A pneumatic stop cylinder under low pressure provides a cushioning abutment at the terminal end of the decelerating rods, and control means are provided to determine when a full row is formed and to permit transfer of the so formed rows of containers from the feed station into a carrier bar only if the rows are full rows. The system additionally provides means for retracting the stop cylinder during transfer of the rows of containers from the feed station into the carriers of the hydrostatic cooker thereby reducing the shear load between the containers when a full stick of containers is being pushed off the feed conveyor.

BRIEF DESCRIPTION OF THE DRAWINGS

FIGS. 1 and 1A when placed end to end are a diagrammatic side elevation of the full row feed system of the present invention.

FIG. 2 is a horizontal section of a screw feeder of the system taken along lines 2—2 of FIG. 1A.

FIG. 3 is an enlarged vertical section taken along lines 3—3 of FIG. 1.

FIG. 4 is an enlarged vertical section taken along lines 4—4 of FIG. 3 illustrating the container decelerating slide rods, certain parts being cut away.

FIG. 5 is an enlarged perspective of the lead in end of the decelerating rods.

FIGS. 6 to 12 are diagrammatic operational views in plan illustrating the sequence of events in forming full rows and deflecting the full rows out of the feed station and into the carriers of the processing conveyor.

FIG. 13 is a diagrammatic view illustrating an electrical and pneumatic control circuit of the full row feed system.

DESCRIPTION OF THE PREFERRED EMBODIMENT

The full row feed system 20 (FIGS. 1, 1A, 2 and 3) of the present invention is provided for gently forming containers C into rows, and after formation of full rows for deflecting only full rows into carriers 21 of a continuously driven endless processing conveyor 22 of a hydrostatic cooker or the like. As indicated in FIG. 3, the carriers 21 are of the articulating type which are opened at a feed station FS when trained around small diameter sprockets 23 secured to a shaft 24.

As shown in FIGS. 1A and 2, a supply of containers C supported on end are moved at random in single file by a supply conveyor 25 defined by a pair of spaced parallel endless chains 25a that are trained around pairs of sprockets 26 and 28 keyed to shafts 30 and 32, respectively, that are journaled in the frame 34 of the system.

A screw conveyor 36 is provided for singulating and spacing the containers and is journaled in bearings 38 secured to the frame 34 on one side of the path of movement of the chains 25a and includes screw threads or ridges 40 which are progressively thicker in the direction of movement of the supply conveyor 25. The containers are engaged by the screw threads 40 which space the containers a sufficient distance apart so that they may be transferred onto their sides without contacting each other. Guide rails 42 and 44 (FIG. 2) and a tension spring 46 are disposed on the other side of the path of movement of the containers to guide the containers along a linear path. If two containers tend to enter a single valley 48 in the screw conveyor 36, the spring 46 will bow outwardly so that the rearmost container will jump to a ridge 40 and enter the next following valley 48 in the screw. The supply conveyor 25 an screw conveyor 36 are driven by a motor 50 (FIG. 1A) and gearbox 52, which gearbox is connected to the shaft 30 by a chain drive 54 and is connected to the screw conveyor 36 by another chain drive 56. As will be noted in FIG. 2, the sprocket ratio of the chain drives is such that the screw conveyor 36 is driven slightly slower than the chains 25 thereby causing the screw threads 40 to retard forward movement of the containers.

After moving out of engagement with the screw conveyor 36, the supply conveyor 25 discharges the spaced and singulated containers C into an inclined generally U-shaped trough 60 during which time the resistance between the trough and the lower portion of the containers C causes each container C to topple from an upright position to a position on its side. The trough 60 is secured to the frame 34 by brackets 62.

The containers C then gravitate down the inclined trough and are received upon the upper run of a feed conveyor 64 (FIG. 1). The feed conveyor 64 is trained around rollers 66, 68 and 70. The rollers 66 is keyed to a shaft 72 of a variable speed motor 74, and the rollers 68 and 70 are keyed to shafts 76 and 78 journaled in the frame 34. The motor 74 drives the feed conveyor 64 at high speed in the direction of the arrows in FIG. 1, and suitable guide rails 80 are provided along the sides of an accumulating portion 82 of the feed conveyor for guiding the containers therealong and into the feed station FS.

The upper run of the feed conveyor 64 rides within a channel track 84 (FIG. 3) which has upstanding flanges or rods 86 rigid therewith and which serve to guide the containers along their linear paths. The foremost containers in each row of containers that enter the feed station FS at high speed, are lifted off the feed conveyor 64 by a pair of container decelerating rods 88 that are disposed on opposite sides of the feed conveyor and which have sharpened downwardly and outwardly inclined forward container lifting end portions 89 for engaging and gently camming the foremost containers of the feed conveyor 64. These containers then slide along the rods thus greatly diminishing their forward speed along the linear row forming path of the feed conveyor.

A pneumatic stop cylinder 90 (FIG. 4) acts as a shock absorber and a pressure relieving means and is mounted at the terminal end of the feed station FS and includes a piston 92 which has an abutment plate 94 on its free end. The plate 94 is preferably surfaced with a material having a low coefficient of friction. During formation of a row of containers, the cylinder 90 has a pneumatic pressure of about 5 p.s.i. therein thus cushioning the impact of the containers as they move into abutting relationship with each other to form a row.

A limit switch LS1 is mounted on the frame 34 and has an actuating lever 96 projecting into the path of movement of the container C and which switch is closed when the foremost container contacts the abutment plate 94 of the stop cylinder 90. In order to determine when a full row of containers is present in the feed station FS, a feed cylinder sensing unit 98

(FIG. 1) is provided and is mounted on the frame 34 adjacent the inlet end of the feed station FS. The sensing unit 98 is of the type which detects the termination of movement of containers therepast and upon such detection closes a switch LS2 (FIG. 13). The feed cylinder sensing unit 98 may be of the type manufactured by Peco Corporation, 111 Ortega Avenue, Mountain View, California. The Peco sensing unit includes a proximity sensor No. B-2663, a time delay module GM No. C2939, and a plug-in relay No. A-3094.

Figures 9, 10, 11:
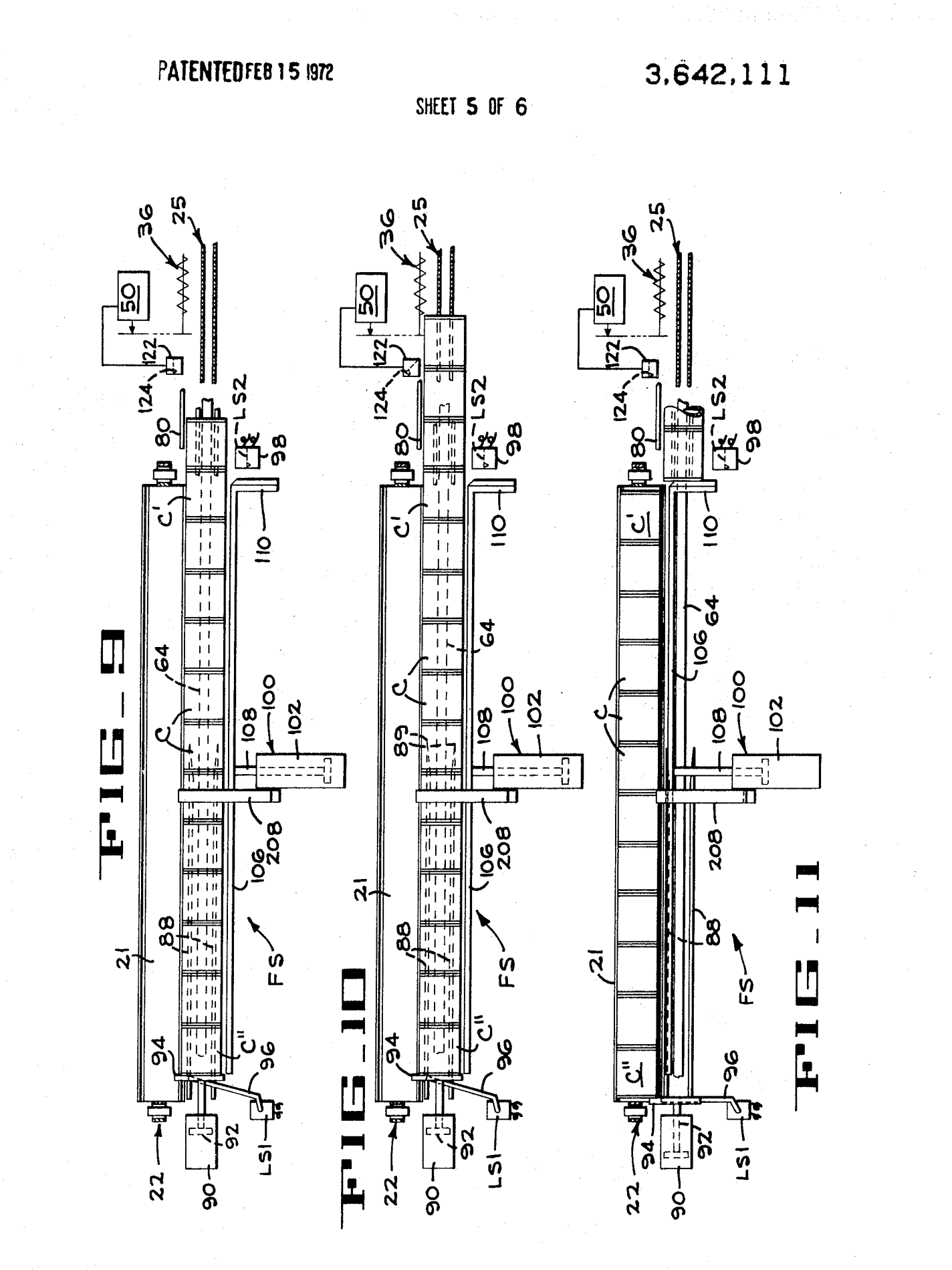

After formation of a full row of containers C in the feed station FS, a transfer mechanism 100 is partially prepared for operation. The transfer mechanism 100 includes a feed cylinder 102 (FIG. 3) connected to the frame 34 by a bracket 104. An elongated pushoff bar 106 is connected to the frame 34 by a bracket 104. An elongated pushoff bar 106 is connected to the piston rod 108 of the feed cylinder 102 and has an abutment plate 110 (FIG. 6) secured to the inlet end thereof. When the bar 106 is in its full line retracted position as illustrated in FIG. 3, a row of containers may be formed in the feed station FS. When the bar 106 is in its extended position as shown in dotted lines in FIG. 3, the bar has deflected a full row of containers into one of the carriers 21 at the feed station FS, and the abutment plate 110 (FIG. 6) momentarily prevents other containers from entering the feed station. The container engaging surface of the abutment plate 110 is preferably provided with a material having a low coefficient of friction in order to reduce the force necessary to extend and retract the pushoff bar 106. As will be described in more detail later, the piston rod 92 (FIG. 4) of the top cylinder 90 is retracted simultaneously with the extension of bar 106 thereby greatly reducing the shear load between the last container C' in the row being deflected from the feed station FS into a carrier 21 (FIGS. 10 and 11) and the foremost container C'' of the next row to be formed.

In order to assure that full rows of containers are deflected from the feed station only when a carrier 21 is in position to receive the containers, a star wheel cam 114 (FIG. 3) is mounted on the shaft 24 and opens a valve 120 each time a carrier 21 is in position to receive a row of containers.

In the event the feed conveyor 64 including the accumulating section 82, is completely filled with containers C, a screw conveyor sensing unit 122 (FIG. 1A) will detect stoppage of the containers C and will open a switch 124 in the circuit to the screw conveyor motor 50 thereby stopping the motor 50 until the containers again commence to move past the sensing unit 122. The sensing unit 122 preferably includes the same components as those used in the feed cylinder sensing unit 98.

A control circuit 130 (FIG. 13) is provided to control the feed system and is basically a pneumatic circuit that includes a main conduit 132 which receives air from a source of air under high pressure. The circuit includes a main valve 134 that is provided with a shiftable core which for convenience will be referred to as having a left-hand portion and a right-hand portion. When the left-hand portion of the core is communicating with certain conduits in the certain 130, as illustrated in FIG. 13, the valve will be said to be in its left-hand position. When the core is shifted so that its right portion communicates with the passages, the valve will be said to be in its right-hand position. The core is shifted between its left-hand position and right-hand position by applying high-pressure air to its left end and right end (FIG. 13), respectively, as will be described hereinafter. The operative positions of the cores of the other valves to be described later will be referred to in the same manner as the main valve 134.

When the core of the main valve 134 is shifted to the right as illustrated, high-pressure air flows from the main conduit 132 through a left port into a conduit 136 that is connected to the active end of the feed cylinder 102. Air in the conduit 136 is blocked by a check valve 138 but flows through a bypass conduit 140 in parallel with the check valve 138. The bypass conduit 140 has an orifice 142 therein which may be adjusted to the control the rate of retraction of the feed cylinder 102. Air is expelled from the other end of the cylinder 102 through a conduit 144 having a check valve 146 therein which opens to permit free passage of air therethrough. This air then flows through a left-hand port in the main valve 134 and is vented to atmosphere. A bypass conduit 148 is connected in parallel across the check valve 146 and has an adjustable orifice 150 therein.

A conduit 152 is connected between the conduit 136 and the closed end of the stop cylinder 90. The conduit 152 has a pressure regulator PR therein which reduces the air pressure from about 100 p.s.i. in the conduit 152 to about 5 p.s.i. as it enters the stop cylinder 90. A check valve 154 is interposed in the conduit 152 and blocks flow of air when moving toward the cylinder 90. However, a bypass conduit 156 is connected in parallel with the check valve 154 and has an adjustable orifice 158 therein through which air flows to extend the stop piston 92 at a controlled rate. Air flows out of the active end of the cylinder 90 through a conduit 160 that is connected to the conduit 144 and which has a check valve 162 therein that opens to permit air to flow therepast. A bypass conduit 164 is connected in parallel with the check valve 162 and has an adjustable orifice 166 therein which permits retraction of the piston rod 92 when air is flowing in the opposite direction. The air which flows out of the stop cylinder 90 when the piston rod is being extended flows from the conduit 160, through the conduit 144 and is vented to the atmosphere by the passage in the left-hand portion of the core of the main valve 134. Thus, it will be noted that when the main valve 134 is in the left position indicated in FIG. 12, the piston in the feed cylinder 102 will be retracted, and the piston in the stop cylinder 90 will be extended under a pressure of about 5 p.s.i. Conversely, when the main valve 134 is in its right-hand position, the piston rod of the feed cylinder 102 will be extended and the piston rod of the stop cylinder 90 will be retracted.

In order to shift the core of the main valve 134 between its right-hand and left-hand positions, a main pilot valve 170, a feed return valve 172, the cam operated carrier positioning valve 120, and a solenoid valve 176 are provided for controlling flow of air to the control circuit.

The solenoid valve 176 is normally in the illustrated closed position which blocks flow of air therethrough, and this valve is energized and shifted to the open position in response to the timely closing of the limit switch LS1, a cam operated timing switch LS3, and the switch LS2 in the feed cylinder sensing unit 98. The timing switch LS3 is closed by a cam 177 keyed to the shaft 24, which cam includes cam lobes that hold the switch LS3 closed for an interval of about 0.2 seconds after the valve 120 has been shifted to its right-hand position. The valve 120 is shifted by lobes 114' on the cam 114 to its right-hand position simultaneously with the closing of the switch LS3 and remains in the shifted position for about 0.4 seconds. Thus, the switch LS3 serves to prevent energization of the solenoid valve 176 unless the switches LS1 and LS2 are closed; within 0.2 seconds after one of the cam lobes 114' has shifted the valve 120 to its right-hand position.

As shown in FIG. 13, the switches LS1, LS2 and LS3 are connected in series with a relay R between main lines L1 and L2 of a source of electrical power. With the three switches closed, relay R is energized thereby closing a relay contact R-1 in series with the solenoid of solenoid valve 176 thus energizing the solenoid and shifting the valve 176 to its open position. The relay R also includes relay contact R-2 which is energized and is positioned in a holding circuit across switch LS3. Thus, the relay R and solenoid valve will remain energized until either switch LS1 or LS2 opens. As mentioned previously, the sensing unit 98 includes a holding circuit and a time delay relay (not shown) which maintains the switch LS2 closed for about 0.4 seconds after the sensing unit 98 detects movement of the containers therepast which occurs when a full row has been transferred into an associated carrier 21. Also, the actuating lever 96 (FIG. 11) of the limit switch LS1 is sufficiently long to maintain contact with the containers for a short period after the cylinder 102 has reached the extended end of its stroke, i.e., until after the core of the pusher return valve 172 has been shifted from its illustrated left-hand position to its right-hand position and until after the core of the valve 120 returns to its left-hand position.

With the parts positioned as illustrated in FIG. 13 but with the switches LS1, LS2 and LS3 closed and the solenoid valve 176 in its open position as would occur shortly after a row of containers has been deflected into a carrier 21, high-pressure air flows from the conduit 132 through pilot lines 180 and is blocked from further flow by the left-hand portion of the core of the return valve 172. High-pressure air also flows through pilot line 182, through a passage 176', in solenoid valve 176, through a conduit 184, through a passage in the left-hand portion of the cam-actuating valve 120, through a conduit 186, and through a conduit 188 into the left-hand end of the pilot valve 170 to maintain the core in the left-hand position. Air is vented from the other end of the pilot valve 170 through a pilot line 190 and a passage in the left portion of the return valve 172 to atmosphere.

High-pressure air in conduit 186 also flows through a passage in the left portion of the pilot valve 170, through a conduit 192 to the left end of the main valve 134 thereby positioning the core in its illustrated left position. Air on the other side of the core of main valve 134 flows through a conduit 194, a passage in the left portion of the valve 170, a conduit 196, and to the atmosphere through a passage in the left-hand portion of the cam-actuated valve 120. A short conduit 198 also connects the conduit 196 to the pilot valve 170 which, when the core is in its illustrated left-hand position, blocks flow therepast.

When a full row of containers has been formed in the feed station FS and a carrier 21 is in position to receive the row, one of the cam lobes 114' shifts the valve 120 to its right-hand position. At this time the switches LS1, LS2, LS3 are closed thereby again energizing the solenoid valve 176 which allows fluid to flow through valve passage 176'. Fluid then flows through the conduit 184, a passage in the right portion of the valve 120, conduit 196, a passage in the left portion of the valve 170, and conduit 194 to the right side of main valve 134 thereby shifting the core to its right-hand position. Air is vented from the left end of the valve 134 through conduit 192, a passage in the left portion of the valve 170, conduit 186, and a passage in the right portion of the valve 120 to the atmosphere.

Shifting of the main valve 134 to its right-hand position causes high-pressure air to flow through conduit 144, conduit 148 and orifice 150 into the cylinder 102 thereby extending the feed cylinder to deflect a full row of containers into the carrier 21 at the feed station FS (FIG. 11). Simultaneously with the extension of the piston rod 108 of the feed cylinder 102, high-pressure air flows through conduit 160, orifice 166 in conduit 164, and into the stop cylinder 90 thereby retracting the piston rod 92. Air is vented from the feed cylinder 102 through conduit 136, check valve 138, and a passage in valve 134 to the atmosphere. Similarly, the air is vented from the stop cylinder 90, through conduit 152, check valve 154, pressure regulator PR, conduit 136 and to the atmosphere through a passage in the right portion of the valve 134. It will be understood that the rate of extension of the piston rod 108 of the feed cylinder 102, and the rate of retraction of the piston 92 of the stop cylinder 90 are controlled by the adjustable orifices 150 and 166, respectively.

The pusher 106 (FIG. 3) on the end of the piston rod 108 of the feed cylinder 102 has a valve shifting rod 206 projecting upwardly therefrom which engages and shifts the feed cylinder return valve 172, which valve is supported by a bracket 208, to its right-hand position when the pusher 106 reaches the end of its stroke. Momentary shifting of the feed cylinder return valve 172 to its right-hand position causes high-pressure air from conduit 180 to flow through a passage in the valve 172 and conduit 190 to shift the core of the valve 170 to its right-hand position. High-pressure air from conduit 182 then flows through passage 176' in solenoid valve 176, conduit 184, a passage in the right-hand position of valve 120, conduit 196, conduit 198, a passage in the right-hand position of valve 170, and through conduit 192 to the right end of main valve 134 thereby shifting the core to its illustrated left-hand position. Air is vented from the right end of valve 134 through conduits 194, a passage in the right-hand position of valve 170, conduit 186, and a passage in the right-hand position of valve 120 to the atmosphere. High-pressure air then flows through the left-hand ports of the main cylinder to retract the piston rod 108 of the feed cylinder and to extend the piston 92 of the stop cylinder 90 through circuits which have already been described.

Prior to the deenergization of solenoid 176, the associated lobes 114' of the star wheel cam 114 moves away from the valve 120 and allows a spring to return the core of valve 120 to the illustrated left-hand position. High-pressure air then flows through conduits 184, 186 and 188 to the left end of the pilot valve 170 thus returning it to its left-hand position. The switches LS1 or LS2 then opens thus deenergizing the relay R and the solenoid valve 176 which blocks flow of air therepast and prepares the system for the next cycle of operation of the feed mechanism.

It is apparent that the control circuit will not permit extension of the piston rod of the feed cylinder 102 unless a full row of containers is present in the feed station FS. If a full row is present both switches LS1 and LS2 will be closed. In addition to closing switches LS1 and LS2, switch LS3 must also be closed. Switch LS3 is provided that the feed cylinder will initiate the extension of its piston rod 108 only during the first 0.2 seconds in which the valve 120 is cammed to its left-hand position thus assuring that the valve 120 will be held in its left position long enough for a complete feed cycle to take place.

The operation of the full row feed system 20 of the present invention will be described primarily in connection with FIGS. 6 to 12 which illustrate progressive phases in the operation of the system. The conveyor 22 (FIG. 1) is continuously driven at the rate of about 25 rows per minute, and accordingly, if all carriers 21 are to be filled each row must be formed and deflected into the associated carrier within a period of about 2.4 seconds. Accordingly it has been found desirable to adjust the several orifice valve 142, 150, 158 and 166 (FIG. 13) and the time delay relay incorporated in the sensing unit 98 so that about 1.8 seconds is allowed for forming each row, and about 0.6 seconds is required for deflecting each row into its associated carrier 21 and returning the pusher 106 to its starting position.

Prior to the introduction of containers into the feed station FS, the pushoff bar 106 is in its retracted position, the abutment plate 94 is in its extended position, and the actuating arm 96 of the limit switch LS1 is spring urged to its switch opening position all as shown in FIG. 6. Containers C that are supported on their ends on the supply conveyor 25 (FIG. 1A) enter the system and are spaced by the screw conveyor 36. The containers then move into the trough 60 and topple over onto their sides and slide downwardly onto the feed conveyor 64. The feed conveyor 64 rapidly advances the containers through its accumulating portion 82 and into the feed station FS (FIG. 7). As the containers enter the feed station FS the foremost containers will be raised off the feed conveyor 64 by the decelerating rods 88 and will decelerate. The foremost containers will slide to a stop unless following containers move into abutting contact and move the foremost containers against the abutment plate thereby closing switch LS1 as illustrated in FIG. 8. Since the air pressure within the stop cylinder 90 is only about 5 p.s.i., the motion terminating impact will be greatly cushioned. Additional containers C will then enter and completely fill the feed station FS as illustrated in FIG. 9 thereby actuating the sensing unit 98 and closing the sensing switch LS2 (FIG. 13). If an abnormal length of time has been consumed during formation of the row, and a carrier has passed the feed station without being filled, a sufficient number of containers may back up behind the containers in the feed station FS to fill the accumulating portion of the feed conveyor 64 thereby activating the sensing unit 122 and opening switch 124 which stops the motor 50 of the input conveyor 25 and screw conveyor 36 until the sensing unit 122 again detects motion of containers therepast.

During normal operation, however, containers will not accumulate to the extent that the switch 124 is opened and accordingly the full row of containers in the feed station will be deflected into the associated carrier that is positioned in the feed station. At this time the switch LS3 (FIG. 13) will be closed and the row deflecting cycle will begin as already described in regard to the control system 130 illustrated in FIG. 13. In this regard, the stop cylinder piston 92 is retracted simultaneously with the extension of the piston rod 108 of the feed cylinder 102 thus reducing the force required for sliding container C' away from container C'' as illustrated in FIG. 11. After the full row of containers has been deflected into its carrier 21, the pusher returns to its retracted position and the stop cylinder 90 returns the abutment plate 94 to its extended position as shown in FIG. 12 thereby preparing the feed system 20 for its next cycle of operation.

From the foregoing description it will be apparent that the full row feed system of the present invention operates at high speed to gently form and deflect only full rows of containers into elongated carrier bars of a processing conveyor for a cooker. The containers are allowed to gently decelerate while moving along a linear path, and controls are provided which will allow only full rows to be deflected into carrier bars that are moving continuously therepast. Also, the system includes a stop cylinder that cushion impact during the row forming operation and which retracts to reduce frictional forces during the row deflecting operation.

Although the best mode contemplated for carrying out the present invention has been herein shown and described, it will be apparent that modification and variation may be made without departing from which is regarded to be the subject matter of the invention.

What we claim is:

1. A high-speed apparatus for gently forming containers into rows and for feeding only full rows of containers at high speeds into elongated carriers of a processing conveyor, comprising feed conveying means for moving spaced containers at high speed along a linear path into a feed station having a terminal end and an inlet end, decelerating means in the feed station for removing a portion of the containers from said feed conveying means and for allowing said portion of containers to slidably decelerate, shock absorbing means at the terminal end of said feed station for terminating movement of containers along said linear path, transfer means for deflecting a full row of containers transversely out of said linear path and into a carrier at said feed station, and control means responsive to the presence of only a full row of containers in said feed station and to the presence of a carrier in position to receive said full row for actuating said transfer means to deflect the full row into the carrier at the feed station.

2. An apparatus according to claim 1 wherein said decelerating means is a pair of bars with the conveyor movable therebetween, said bars being arranged to engage and lift said portion of the containers off said feed conveyor means.

3. An apparatus according to claim 2 wherein said bars extend from about the midpoint of said feed station to said terminal end.

4. An apparatus according to claim 1 wherein said shock absorbing means is the piston rod of a pneumatic cylinder having a cushioning air pressure of about 5 p.s.i. therein.

5. An apparatus according to claim 4 wherein said transfer means includes an elongated pusher bar having an abutment plate secured to the inlet end thereof and extending away from the carriers thereby preventing additional containers from entering the feed station when said transfer means is deflecting a row of containers into said carrier, said control means including means for simultaneously actuating said transfer means and for venting the air from said pneumatic cylinder thereby minimizing frictional forces which resist deflection of the row of containers into the carrier.

6. An apparatus according to claim 1 wherein said control means includes switch means at said terminal end of said path which is activated in response to a container contacting said shock absorbing means, and sensing means adjacent the inlet end of said feed station which is activated upon detecting the termination of movement of containers therepast, said control means being effective for actuating said transfer means only after both said switch means and said sensing means are activated.

7. An apparatus according to claim 1 wherein said feed conveying means includes an accumulating section upstream of said feed station of sufficient length to accumulate a full row of containers therein, and additionally comprise a supply conveyor upstream of said accumulating section for moving a random supply of containers supported on their ends along said path, a screw conveyor disposed alongside said supply conveyor for singulating and spacing the containers, a motor for driving said supply conveyor and said screw conveyor, and an inclined chute disposed between said supply conveyor and said accumulating section for causing the singulated and spaced containers to gravitate from an upright position to a position supported on their sides.

8. An apparatus according to claim 7 and additionally comprising a supply conveyor sensing unit disposed adjacent the upstream end of said accumulating section, said supply conveyor sensing unit including a switch in the power circuit to said motor which switch is opened to deactivate said motor when said supply conveyor sensing unit detects stoppage of containers in said accumulating section.

9. In a high-speed container feeding apparatus the combination of feed conveying means for moving spaced containers at high speed along a linear path and including an accumulating section, a supply conveyor upstream of said accumulating section for moving a random supply of containers supported on their ends along said path, a screw conveyor disposed alongside said supply conveyor for singulating and spacing the containers, a motor for driving said supply conveyor and said screw conveyor, an inclined chute disposed between said supply conveyor and said accumulating section for causing the singulated and spaced conveyors to gravitate from an upright position to a position supported on their sides, and supply conveyor control means responsive to the stoppage of the containers in said accumulating section for deactivating said motor.

10. The method of forming containers into a row at a feed station and transferring a full row of containers out of the feed station, comprising the steps of moving a linear row of containers by frictional force applied to the containers from below along a linear path into and along an initial length only of feed station having an inlet end and a terminal end, slidably wedging downstream containers clear of said applied frictional force along the remaining length of said feed station as the upstream containers continue to push downstream containers along, gently precluding further movement of containers at said terminal end, detecting the presence of a full row of containers in said feed station, and deflecting the full row of containers transversely out of the station only after detection of a full row of containers in the feed station.

11. In a high-speed apparatus for gently forming containers into rows and for deflecting the formed rows transversely, the combination of a continuously driven feed conveying means for moving the containers along a linear path at high speeds into a feed station having an input end and a terminal end, shock absorbing means at the terminal end of said feed station for terminating movement of containers along said path, decelerating means for lifting a portion of the containers forming each row off said conveying means and frictionally decelerating them along said linear path.

12. An apparatus according to claim 11 wherein said decelerating means is a pair of bars having the conveyor disposed therebetween, said bars being arranged to engage and lift said portion of the containers off said feed conveying means.

13. An apparatus according to claim 11 wherein said bars extend from about the midpoint of said feed station to said terminal end.

14. An apparatus according to claim 11 wherein said shock absorbing means is the piston rod of a pneumatic cylinder having a cushioning air pressure of about 5 p.s.i. therein.

15. An apparatus according to claim 11 and additionally including control means for detecting the presence of a full row of containers in said feed means, and transfer means responsive to the detection of a full row of containers for deflecting the full row out of said linear path.

16. Container transfer apparatus of the type wherein the containers are fed along a path into a feed station and against a container presence detector at the end of the path, a pusher controlled by a signal from said presence detector for moving the feed station containers transversely out of said path into a receiver; the improvement wherein only a single row of containers is fed along said path, a container motion detector at the input end of said path that gives a control signal only when movement of containers past said motion detector ceases, and means interconnecting said container presence detector, said container motion detector and said pusher for causing the latter to operate only when both detectors provide a signal.

* * * * *

PO-1050
(5/69)

UNITED STATES PATENT OFFICE
CERTIFICATE OF CORRECTION

Patent No. __3,642,111__  Dated __February 15, 1972__

Inventor(s) __JAMES L. REIMERS et al__

It is certified that error appears in the above-identified patent and that said Letters Patent are hereby corrected as shown below:

Column 2, line 21 delete "to".
Column 2, line 41 change "rollers" to --roller--.
Column 3, line 14, delete "frame 34 by a bracket 104. An elongated pushoff bar 106 is connected to the".
Column 3, line 30, change "top" to --stop--.
Column 3, line 56, change "certain" to --circuit--, second occurrence; line 74, cancel "the", first occurrence.

Signed and sealed this 10th day of October 1972.

(SEAL)
Attest:

EDWARD M. FLETCHER, JR.　　　　　　　ROBERT GOTTSCHALK
Attesting Officer　　　　　　　　　　　Commissioner of Patents